United States Patent
Bagoren et al.

(10) Patent No.: US 6,934,529 B2
(45) Date of Patent: Aug. 23, 2005

(54) REPLENISHMENT OF PRE-PAID WIRELESS TELEPHONE ACCOUNTS USING SHORT MESSAGE SERVICE (SMS)

(76) Inventors: Sevket Ilhan Bagoren, 10 Evergreen Ave., Westport, CT (US) 06880; Bekir Sami Serbetcioglu, 20 Country Club La., Easton, CT (US) 06612; Esref Salih Ozulkulu, 18 Indian Hill Rd., Monroe, CT (US) 06468; Burak Ertas, 67 Ada Kardelen 4-2 D:35 Atasehir, Istanbul (TR); Cem Koca, Menekse Sok. No:17 Gaziosmanpasa, Istanbul (TR)

( * ) Notice: Subject to any disclaimer, the term of this patent is extended or adjusted under 35 U.S.C. 154(b) by 545 days.

(21) Appl. No.: 09/788,804

(22) Filed: Feb. 20, 2001

(65) Prior Publication Data

US 2002/0115424 A1 Aug. 22, 2002

(51) Int. Cl.[7] ............................................. H04M 11/00
(52) U.S. Cl. ................. 455/406; 455/408; 455/412.2; 455/466; 379/114.16; 379/114.17
(58) Field of Search .............................. 455/406, 408, 455/410, 412.2, 414.1, 466; 379/114.16, 114.17, 144.01; 235/380, 381; 705/26, 39

(56) References Cited

U.S. PATENT DOCUMENTS

| | | | |
|---|---|---|---|
| 4,776,003 A | 10/1988 | Harris | 379/91 |
| 5,220,593 A | 6/1993 | Zicker et al. | 379/59 |
| 5,359,182 A | 10/1994 | Schilling | 235/380 |
| 5,412,726 A | * 5/1995 | Nevoux et al. | 380/249 |
| 5,692,037 A | 11/1997 | Friend | 379/114 |
| 5,719,918 A | 2/1998 | Serbetciouglu | 379/58 |
| 5,729,591 A | * 3/1998 | Bailey | 379/59 |
| 5,737,423 A | 4/1998 | Manduley | 380/25 |
| 5,764,742 A | * 6/1998 | Howard et al. | 379/114 |

(Continued)

FOREIGN PATENT DOCUMENTS

| | | | |
|---|---|---|---|
| WO | WO 96/13814 | 9/1996 | G07F/7/08 |
| WO | WO-9809255 | * 3/1998 | G07F/7/08 |
| WO | WO-0033264 | * 6/2000 | G07F/7/08 |
| WO | WO 00/33264 | 8/2000 | G07F/7/08 |

Primary Examiner—Stephen D'Agosta
(74) Attorney, Agent, or Firm—Gordon & Jacobson, P.C.

(57) ABSTRACT

A method for replenishing a pre-paid telecommunications account utilizes the short message service (SMS). When an account balance is low, a pre-paid service control point (PP-SCP) sends a message to a pre-paid payment server which composes an SMS message and sends it to a short message service center (SMSC). The SMSC forwards the message to a mobile switching center (MSC) which passes the message to the subscriber's mobile unit. A confirmation message is automatically sent in a similar manner back to the pre-paid payment server. To replenish the account, the subscriber composes an SMS message using the mobile unit and sends the message to an MSC which forwards it to the pre-paid payment server via an SMSC. The pre-paid payment server validates the request via a billing and finance system, then sends a message to the PP-SCP for account update.

8 Claims, 2 Drawing Sheets

U.S. PATENT DOCUMENTS

| | | | | |
|---|---|---|---|---|
| 5,777,305 A | * | 7/1998 | Smith et al. | 235/380 |
| 5,787,154 A | | 7/1998 | Hazra et al. | 379/93.03 |
| 5,796,832 A | | 8/1998 | Kawan | 380/24 |
| 5,812,641 A | | 9/1998 | Kanoh et al. | 379/91.02 |
| 5,835,580 A | * | 11/1998 | Fraser | 379/115 |
| 5,859,419 A | | 1/1999 | Wynn | 235/487 |
| 5,875,394 A | | 2/1999 | Daly et al. | 455/411 |
| 5,878,337 A | | 3/1999 | Joao et al. | 455/406 |
| 5,886,333 A | | 3/1999 | Miyake | 235/380 |
| 5,887,266 A | | 3/1999 | Heinonen et al. | 455/558 |
| 5,903,830 A | | 5/1999 | Joao et al. | 455/406 |
| 5,915,226 A | * | 6/1999 | Martineau | 455/558 |
| 5,917,168 A | * | 6/1999 | Nakamura et al. | 235/379 |
| 5,960,416 A | * | 9/1999 | Block | 705/34 |
| 6,010,067 A | | 1/2000 | Elbaum | 235/380 |
| 6,012,634 A | | 1/2000 | Brogan et al. | 235/380 |
| 6,028,920 A | * | 2/2000 | Carson | 379/144 |
| 6,029,151 A | * | 2/2000 | Nikander | 705/39 |
| 6,029,892 A | * | 2/2000 | Miyake | 235/380 |
| 6,035,025 A | * | 3/2000 | Hanson | 379/144 |
| 6,058,300 A | | 5/2000 | Hanson | 455/406 |
| 6,067,529 A | * | 5/2000 | Ray et al. | 705/26 |
| 6,078,820 A | | 6/2000 | Wells et al. | 455/466 |
| 6,115,601 A | | 9/2000 | Ferreira | 455/406 |
| 6,169,890 B1 | * | 1/2001 | Vatanen | 455/406 |
| 6,170,745 B1 | * | 1/2001 | Schilling | 235/382.5 |
| 6,375,073 B1 | * | 4/2002 | Aebi et al. | 235/379 |
| 6,567,657 B1 | * | 5/2003 | Holly et al. | 455/408 |
| 2003/0176162 A1 | | 9/2003 | Planki et al. | 455/3.01 |

* cited by examiner

REPLENISHMENT OF PRE-PAID WIRELESS TELEPHONE ACCOUNTS USING SHORT MESSAGE SERVICE (SMS)

BACKGROUND OF THE INVENTION

1. Field of the Invention

The invention relates to telecommunications. More particularly, the invention relates to pre-paid telephone services.

2. State of the Art

Pre-paid wireless service enables customers to utilize the convenience of cellular and digital communications by establishing a prepaid account with a wireless telecommunications vendor. A prepaid account may be created by linking a debit or credit card to the account or by purchasing pre-paid wireless cards for cash. Typically, pre-paid wireless cards are purchased in preset denominations at a limited number of locations. The cards are issued in fixed value increments, for example, $20, $50 or $100. Each card provides the purchaser with a specified amount of wireless calling dollars or minutes. After the initial allocation is exhausted (or shortly before), when the customer uses the phone, a recorded message will be played indicating that the pre-paid account needs to be replenished.

One way the customer can replenish the account is by calling an 800 number, having a credit card handy, and either talking with a customer service representative (CSR) or using an automated system (IVR, interactive voice response) to charge additional minutes to the credit card. Another method is to link the account to a credit or debit account and choose a personal identification number (PIN) for accessing the account during replenishment. However, some customers have pre-paid wireless accounts because of credit problems and thus may not have a valid credit card available for this purpose. Thus, a third method of replenishing the account is to enter a code number from a pre-paid wireless card purchased for cash. Regardless of the method used, the present system is burdensome to both the customer and the wireless carrier as it utilizes several minutes of valuable air time.

SUMMARY OF THE INVENTION

It is therefore an object of the invention to provide a method for replenishing a pre-paid telecommunications account.

It is also an object of the invention to provide a method for replenishing a pre-paid telecommunications account which does not require a credit or debit card.

It is another object of the invention to provide a method for replenishing a pre-paid telecommunications account which does not waste valuable air time.

In accord with these objects which will be discussed in detail below, the methods of the present invention include the use of a short message service (SMS) message to notify a subscriber when the pre-paid account needs to be replenished and to replenish the account. According to a first method of the invention, a pre-paid service control point (PP-SCP) determines when an account needs to be replenished via interaction with a pre-paid mobile subscriber PP-MS database. When it is near time to replenish the account, the PP-SCP sends a message to a pre-paid payment server (PP-Payment SVR) which may be part of or separate from the PP-SCP. The PP-Payment SVR composes an SMS message and sends it to a short message service center (SMSC). The SMSC accesses a home location register (HLR) to determine the address of the mobile switching center (MSC) servicing the subscriber. The SMSC then forwards the SMS message to the MSC, e.g., via SMS__PP__Delivery protocol. The MSC then forwards the SMS message to the subscriber's mobile unit. In response, the mobile unit preferably sends an acknowledgment to the MSC that the SMS message was received. The acknowledgment is forwarded by the MSC to the SMSC which forwards it to the PP-Payment SVR.

In order to replenish the account, a subscriber uses the mobile unit to compose an SMS message and send it to the MSC. The SMS message includes the number of minutes (or dollars worth of time) to be purchased and the subscriber's PIN number, if the subscriber has a credit/debit account linked to the telecommunications account. If the subscriber does not have a linked credit/debit account, the SMS message includes the code number from a pre-paid wireless card purchased for cash. The SMS message is sent from the MSC to the SMSC which forwards the message to a the PP-Payment SVR. The PP-Payment SVR verifies the information in the SMS message by accessing with a Billing and Finance System. The Billing and Finance System verifies the pre-paid card serial number or the PIN and credit/debit balance and responds to the PP-Payment SVR. If the transaction is approved, the PP-Payment SVR informs the PP-SCP which updates the PP-MS Account database. The PP-Payment SVR also sends a confirmation message to the SMSC. The SMSC accesses the HLR to determine the address of the MSC servicing the subscriber and forwards the SMS confirmation message to the appropriate MSC. The MSC then forwards the SMS confirmation message to the mobile unit.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
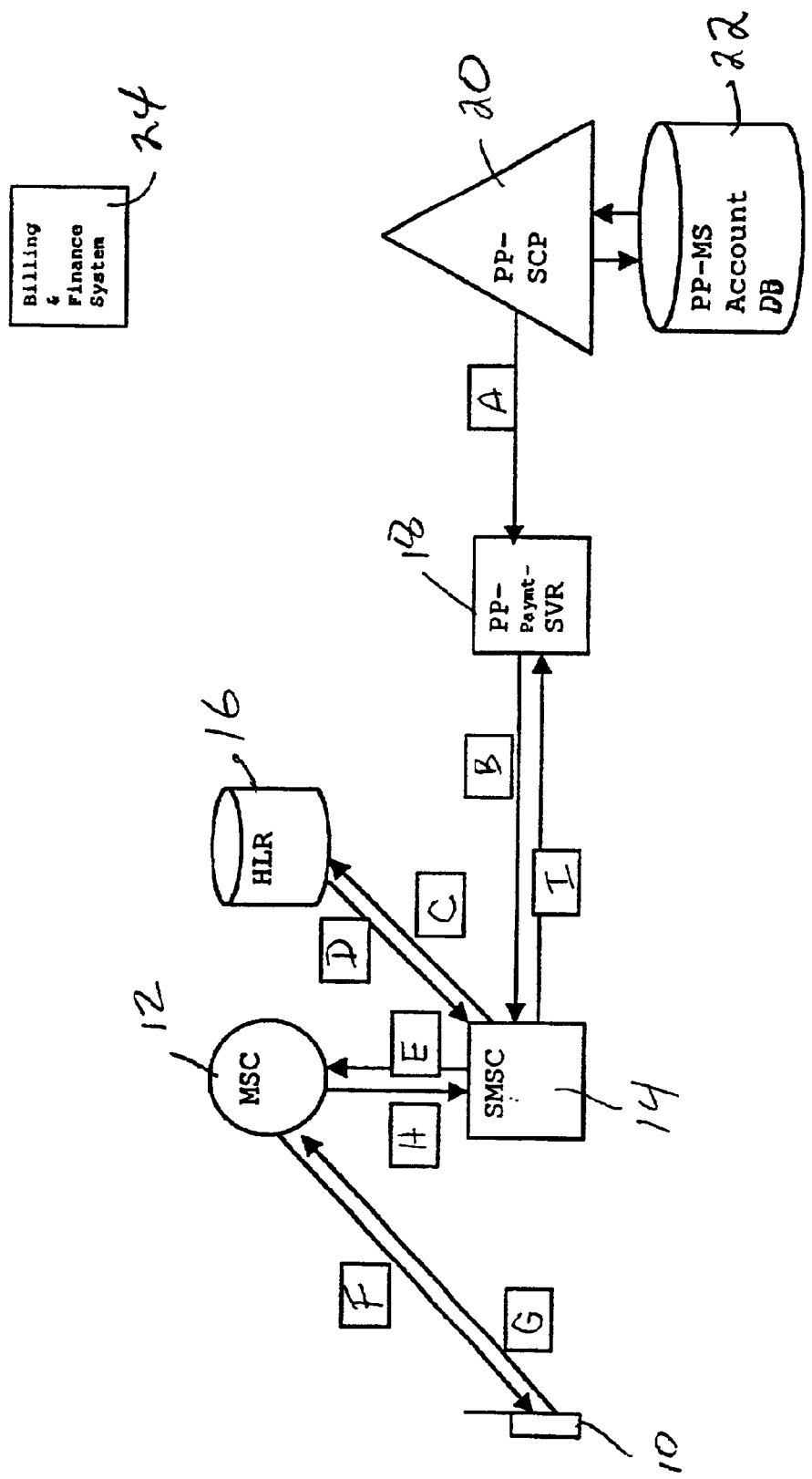
FIG. 1 is a schematic illustration of the systems of the invention and a first method of the invention.
Figure 2:
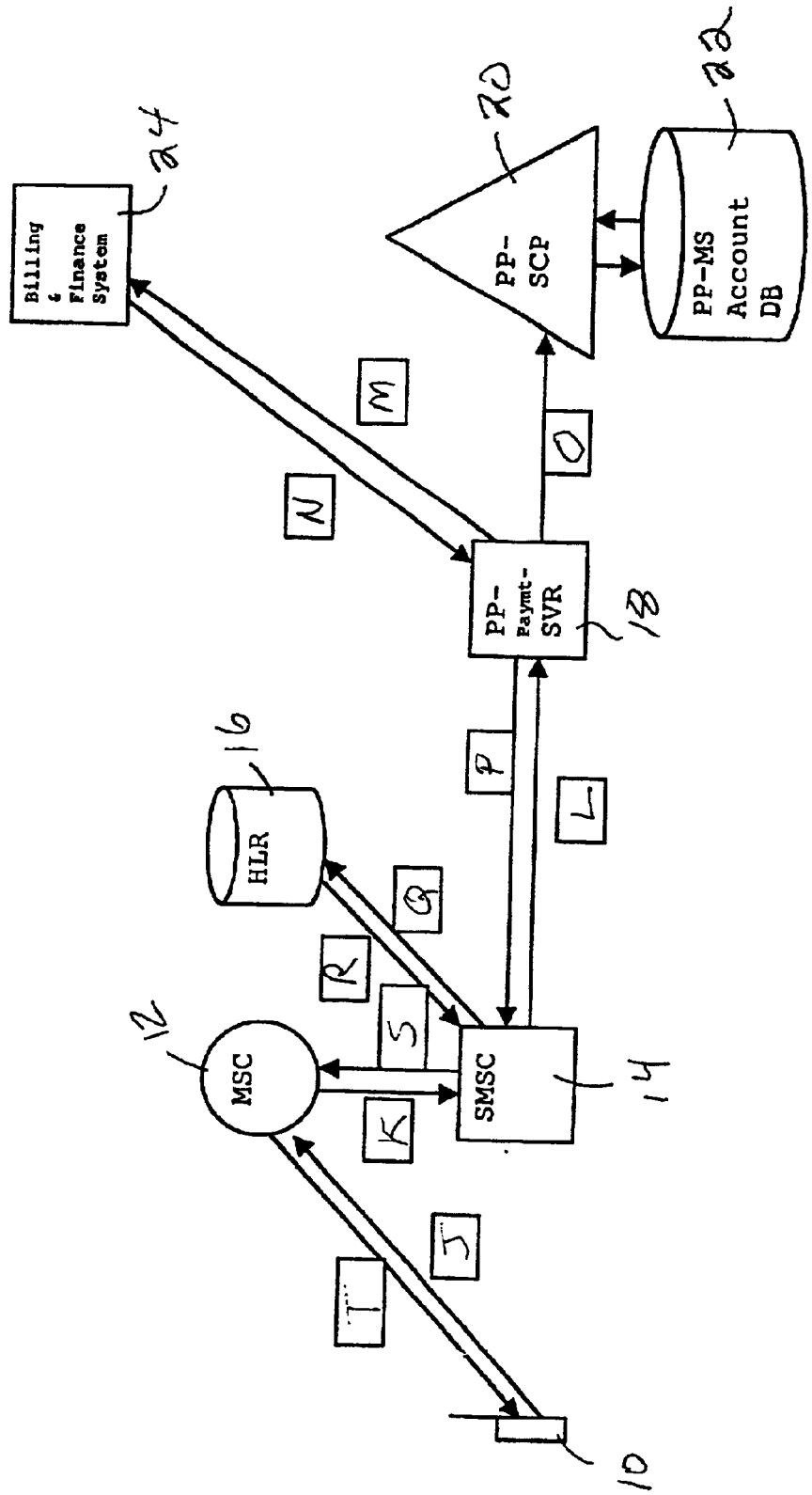
FIG. 2 is a schematic illustration of a second method of the invention.

Referring now to FIGS. 1 and 2, the methods and systems of the invention are best explained with reference to the following apparatus: a mobile unit 10 having short nessaging capabilities, at least one mobile switching center 12, a short message service center 14, a home location register 16, a pre-paid payment server 18, a pre-paid service control point 20, a pre-paid mobile subscriber account database 22, and a billing and finance system 24.

Turning now to FIG. 1, according to a first method of the invention, a pre-paid service control point (PP-SCP) 20 determines when an account needs to be replenished via interaction with a pre-paid mobile subscriber (PP-MS) database 22. When it is near time to replenish the account, the PP-SCP 20 sends a message "A" to a pre-paid payment server (PP-Payment SVR) 18 which may be part of or separate from the PP-SCP 20. The PP-Payment SVR 18 composes an SMS message "B" and sends it to a short message service center (SMSC) 14. The SMSC 14 accesses a home location register (HLR) 16 to determine the address of the mobile switching center (MSC) 12 servicing the subscriber. In particular, the SMSC 14 sends a message "C" to the HLR 16 and receives a response "D" from the HLR 16. The SMSC 14 then forwards the SMS message "E" to the MSC 12 via, e.g., SMS_PP_Delivery. The MSC 12 then forwards the SMS message "F" to the subscriber's mobile unit 10. Message F preferably includes an alphanumeric message and triggers an auditory warning that a message has arrived. The aforementioned message preferably states the balance on the account, either in dollars or minutes or both. The mobile unit 10 sends an acknowledgment "G" to the MSC 12 that the SMS message "F" was received. The acknowledgment is forwarded at "H" by the MSC 12 to the SMSC 14 which forwards it at "I" to the PP-Payment SVR 18.

Referring now to FIG. 2, in order to replenish the account, a subscriber uses the mobile unit 10 to compose an SMS message "J" and send it to the MSC 12. It should be appreciated by those skilled in the art that the SMS message generated by the mobile unit 10 may be at least partially generated by simply actuating a reply button on the mobile unit. The SMS message preferably includes the number of minutes (or dollars worth of time) to be purchased and the subscriber's PIN number, if the subscriber has a credit/debit account linked to the telecommunications account. If the subscriber does not have a linked credit/debit account, the SMS preferably message includes the code number from a pre-paid wireless card purchased for cash. The SMS message is sent from the MSC 12 at "K" to the SMSC 14 which forwards the message at "L" to a the PP-Payment SVR 18. The PP-Payment SVR 18 verifies the information in the SMS message by accessing a Billing and Finance System 24. In particular, the PP_Payment SVR 18 sends a message "M" to the Billing and Finance System 24. The Billing and Finance System 24 verifies the pre-paid card serial number or the PIN and credit/debit balance and responds at "N" to the PP-Payment SVR 18. If the transaction is approved, the PP-Payment SVR 18 informs the PP-SCP 20 at "O" and the PP-SCP 20 updates the PP-MS Account database 22. The PP-Payment SVR 18 also sends a confirmation message "P" to the SMSC 14. The SMSC 14 accesses the HLR 16 to determine the address of the MSC 12 servicing the subscriber. In particular, the SMSC 14 sends a message "Q" to the HLR 16 and receives a replay "R". The SMSC 14 then forwards the SMS confirmation message "S" to the appropriate MSC 12. The MSC 12 then forwards the SMS confirmation message "T" to the mobile unit 10.

There have been described and illustrated herein systems and methods for replenishing a pre-paid telecommunications account. While particular embodiments of the invention have been described, it is not intended that the invention be limited thereto, as it is intended that the invention be as broad in scope as the art will allow and that the specification be read likewise. Thus, while the invention has been described with respect to particular aspects of the short messages sent to the mobile unit and from the mobile unit, it will be appreciated that additional information or a subset of the information can be sent. For example, while it is preferred that a PIN number be utilized to cause a credit/debit account charge to be authorized, the PIN is not absolutely necessary, and an email could be sent to the owner of the mobile unit to confirm the transaction if some level of security is desired. Also, while the SMS message generated by the mobile unite preferably includes a code number from a pre-paid wireless card or a PIN number, the SMS message could alternatively include a credit card number and PIN which would require different processing by one or more of the SMSC, the PP_Payment SVR and the Billing and Finance System. It will therefore be appreciated by those skilled in the art that yet other modifications could be made to the provided invention without deviating from its spirit and scope as so claimed.

What is claimed is:

1. A method for replenishing a pre-paid telecommunications account, said method comprising:

a) composing an SMS message using a mobile unit, the message including a requested replenishment amount;

b) sending the SMS message to a pre-paid payment server;

c) validating the message at the pre-paid payment server, said validating including determining whether the account associated with the mobile unit has sufficient funds/credit to disburse the requested replenishment amount;

d) if the message is valid, replenishing the account, e) monitoring the account database;

f) determining when the subscriber account is due for replenishment;

g) sending an SMS message to the mobile unit indicating that the account is due for replenishment and indicating the account balance;

h) automatically generating a confirmation message at the mobile unit; and i) sending the confirmation message to the pre-paid payment server via SMS.

2. The method according to claim 1, wherein:

the message includes a PIN, and said step of validating includes verifying the PIN.

3. The method according to claim 1, wherein:

said step of validating includes communicating with a billing and financial system.

4. The method according to claim 1, wherein:

said step of replenishing includes accessing a pre-paid mobile subscriber account database.

5. An apparatus for replenishing a pre-paid telecommunications account, said apparatus comprising:

a) a mobile unit having means for sending and receiving SMS messages;

b) a pre-paid payment server having means for sending and receiving SMS messages;

c) means for validating a replenishment request received as an SMS message; and d) means for replenishing the account in response to a validated replenishment request received as an SMS message;

e) means for monitoring an account database;

f) means for determining when the subscriber account is due for replenishment; and g) means for sending an SMS message to the mobile unit indicating that the account is due for replenishment and indicating the account balance;

h) means for automatically generating a confirmation message at the mobile unit; and i) means for automatically sending the confirmation message to the pre-paid payment server via SMS, wherein the replenishment request includes a requested replenishment amount and said means for validating includes means for determining whether the account associated with the mobile unit has sufficient funds/credit to disburse the requested replenishment amount.

6. The apparatus according to claim 5, wherein:

the replenishment request includes a PIN, and said means for validating includes means for authenticating the PIN.

7. The apparatus according to claim 5, further comprising:
e) a billing and financial system, wherein
said means for validating includes means for communicating with the billing and financial system.

8. The apparatus according to claim 5, wherein;

said means for replenishing includes means for accessing a pre-paid mobile subscriber account database.

* * * * *